No. 809,599. PATENTED JAN. 9, 1906.
E. S. WOODS.
ROLLER SIDE BEARING FOR RAILWAY CARS.
APPLICATION FILED JUNE 16, 1905.
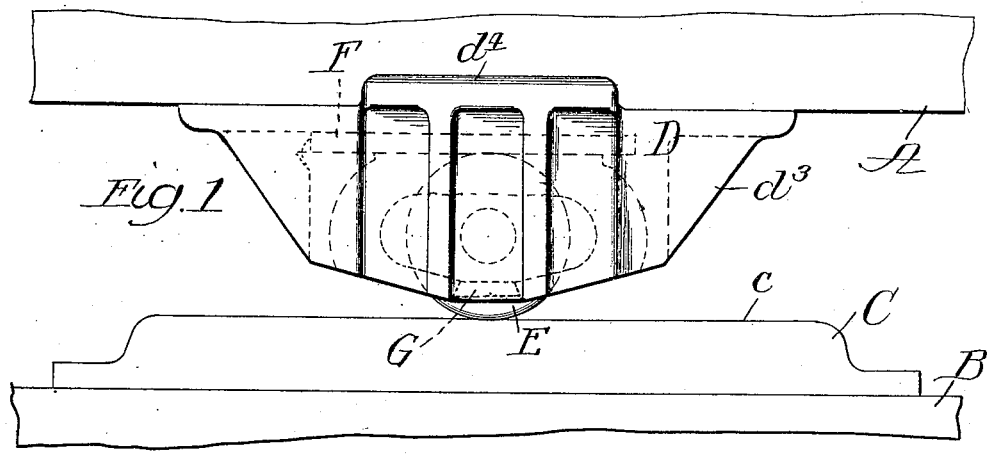
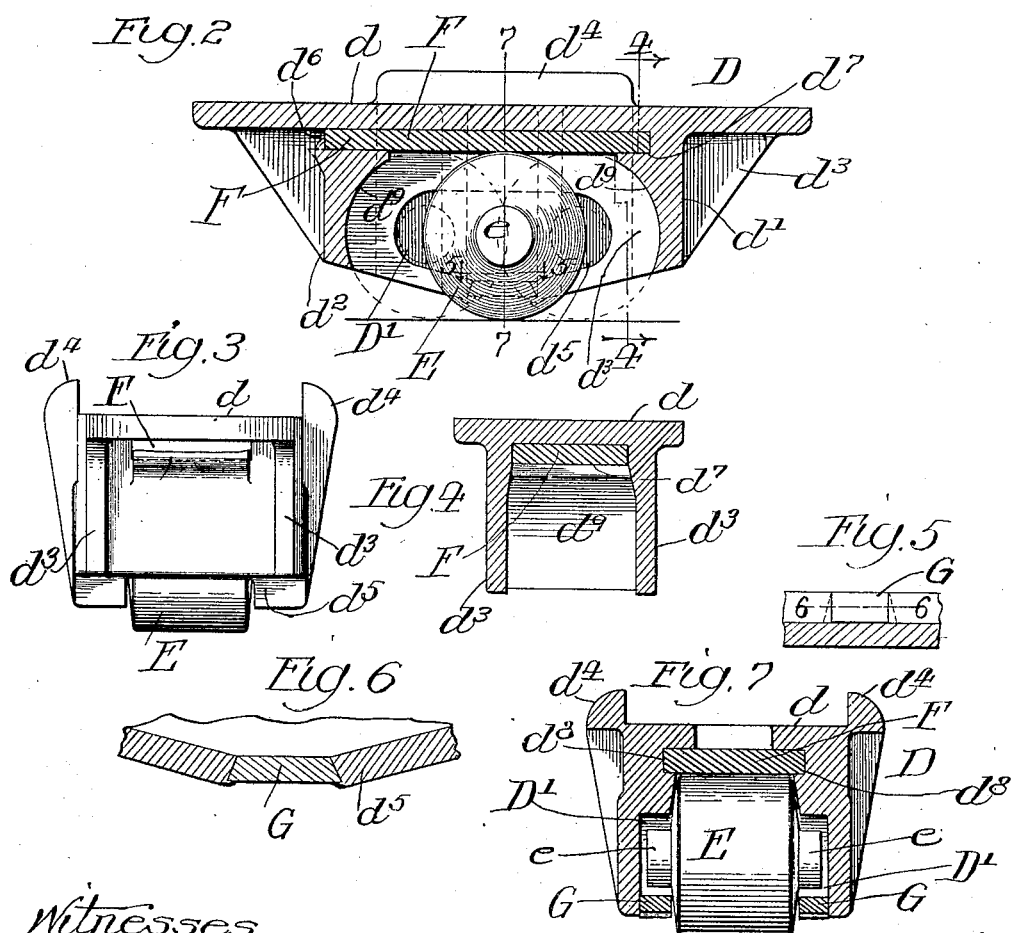

UNITED STATES PATENT OFFICE.

EDWIN S. WOODS, OF CHICAGO, ILLINOIS.

ROLLER SIDE BEARING FOR RAILWAY-CARS.

No. 809,599.  Specification of Letters Patent.  Patented Jan. 9, 1906.

Application filed June 16, 1905. Serial No. 265,542.

*To all whom it may concern:*

Be it known that I, EDWIN S. WOODS, a citizen of the United States, residing at Chicago, in the county of Cook and State of Illinois, have invented certain new and useful Improvements in Roller Side Bearings for Railway-Cars; and I do hereby declare that the following is a full, clear, and exact description thereof, reference being had to the accompanying drawings, and to the letters of reference marked thereon, which form a part of this specification.

This invention relates to improvements in roller-bearings for railway-cars of that class adapted to be interposed between the car bolster and truck of a railway-car in such a manner as to afford an antifriction-bearing between said car bolster and truck upon the occasion of relative angular movement of the truck and car, as when the car is passing around a curve. Such type of bearing embraces a suitable elongated chambered casting or housing adapted to be attached to the car-bolster and open at its lower side and provided at its top with a downwardly-facing bearing member or surface and an antifriction roller or rollers contained in said housing and adapted to project through said lower open side of the casting and to coöperate with said downwardly-facing bearing-surface and an upwardly-facing bearing-surface carried by the truck. Said antifriction roller or rollers are provided with end bearings or trunnions which engage channels or ways in the side walls of the chambered casting or housing, and the parts are so constructed that weight is transmitted from the car-bolster to the truck through roller or rollers without bringing vertical stress upon the end bearings or trunnions thereof; but when said upper and lower bearing members separate, as when the car tilts in passing around a curve, or when said bearing-surfaces are at other times separated the roller or rollers drop with the end bearings or trunnions thereof resting on the lower walls of said channels or ways, at which time the roller or rollers are free to rotate out of contact with said upper and lower bearing-surfaces, and thereby present new peripheral bearing with said upper and lower surfaces at their next contact therewith.

Among the objects of my invention is to provide a bearing of this character which may be economically manufactured, while possessing ample strength and high efficiency.

A further object of the invention is to provide means for arresting the antifriction-roller at the end of its travel without bringing stress upon the end bearings or trunnions of the roller, thereby permitting the trunnions to be made small.

A still further object of the invention is to provide a novel key for closing the openings at the bottom of the casting, through which are passed the roller and bearings or trunnions when the roller is admitted to the chambered casting or housing.

As shown in the drawings, Figure 1 is a side elevation of one pair of upper and lower bearing members and an interposed roller of a bearing embodying my invention. Fig. 2 is a vertical longitudinal section of the upper bearing member, showing the roller in end elevation. Fig. 3 is an end view thereof. Fig. 4 is a vertical section taken on line 4 4 of Fig. 2 looking in the direction indicated by the arrow. Fig. 5 is a fragmentary top plan view of the bottom wall of the channel or way for the end bearings or trunnions of the roller. Fig. 6 is a cross-section taken on line 6 6 of Fig. 5. Fig. 7 is a transverse vertical section of the upper member, illustrating a modification.

As shown in the drawings, A designates a fragment of the body-bolster of a car, and B a portion of the truck beneath the same. The truck is provided with a bearing member or plate C, having an upwardly-facing bearing-surface $c$. Located above said bearing-plate C and attached to the under side of the car-bolster is a chambered casting or housing, (designated as a whole by D.) Said casting comprises a top wall $d$, end walls $d'$ $d^2$, and side walls $d^3$. Preferably the top wall is extended beyond the end walls, and said extensions of the top wall are braced from the end walls by integral webs $d^3$. The top wall of the casting is provided with laterally-separated flanges $d^4$ $d^4$, which fit closely the opposite side faces of the car-bolster A and aid to hold the same from lateral movement.

E designates a cylindric roller that is located within the chambered casting or housing and is adapted for bearing engagement with the lower bearing-plate C on the truck and with an upper bearing-surface within said housing, the latter being open at its lower side to permit the roller to project therefrom. The side walls of said chambered casting are provided on their inner faces with longitudinal channels or ways D', which receive the end bearings or trunnions $e$ of the roller, and said channels and the chamber are made of a length to permit bodily movement of the roller in the housing as it rolls in contact with the upper and lower bearing-surfaces. The channels D' are made of such depth relatively to the diameter of the roller and its end bearings or trunnions that when the roller is engaged with the upper and lower bearing-surfaces the trunnions or end bearings are lifted free from the bottom walls $d^5$ of the ways or channels, so that the entire weight transmitted through the bearing is taken by the roller, and no weight or vertical stress is thrown upon the end bearings or trunnions. When, however, the upper and lower bearing members separate, as when the car tilts in passing around a curve, the roller drops, with its end bearings or trunnions engaged with the bottom walls of said channels or ways, so that said roller is free to rotate in the casting to present different surfaces of its periphery to the upper and lower bearing-surfaces at the next contact with said surfaces. Said bottom walls of the channels, as herein shown, incline inwardly toward the longitudinal center of the channel, and with this arrangement the roller when free finds its way to the central or lowest part of the chamber. The channels or ways may, however, be made of other form to give a different direction of movement to the roller when free.

The upper bearing-surface in the casting D is formed on a steel plate F, made separate from the casting and fitting flat against the lower face of the upper wall of the casting. Said plate F is inserted endwise in the casting or housing through an opening $d^6$ in the end wall $d^2$ thereof. Said bearing or wear plate F is shown as supported at its end remote from said admission-opening $d^6$ in a socket $d^7$ at the upper side of the wall $d'$ of the casting, the bottom of said socket constituting a ledge which supports one end of the plate. The bearing-plate F is held in place by upsetting the corner of the end wall at the lower margin of the admission-opening $d^6$ over the end of the plate, as shown in full lines in Fig. 2, the dotted line indicating the original contour of the casting. Said plate is thus supported at its ends upon the end walls of the casting and is held reliably in place by an exceedingly simple and inexpensive locking means. Desirably the housing D is made of malleable iron, which is both light and economical in its structure, and the bearing plate or member F is cut from flat bar-stock and is applied to the casting without the necessity of machine-work. The upper bearing member, while capable of being made light, is relatively nexpensive as compared to the usual manner of making the same and possesses ample strength and wearing qualities.

In the construction thus far described the wear or bearing plate F is supported on the end walls of the casting. In some instances the side walls may be provided with inwardly-opening longitudinal grooves $d^8$ in line with the admission-opening $d^6$ for the plate, and thus support the plate from the side walls of said casting, as shown in Fig. 7. As a further and separate improvement the end walls $d'$ $d^2$ are provided with inwardly-facing curved stop-surfaces $d^9$, complemental to the curvature of the roller, which are adapted for engagement by the periphery of the roller to arrest bodily movement thereof when the roller reaches the end of its travel in said casting or housing. Said curved stops are so related to the end of the trunnion-channels D' that the roller is arrested before the trunnions or end bearings of the roller strike the ends of said channels or ways. This construction permits a material reduction in the diameter of the trunnions or end bearings of the rollers and the vertical depth of the channels as compared with constructions wherein said roller is arrested by engagement of the end bearings or trunnions thereof with the end walls of the channels or ways, inasmuch as said trunnions merely act as guides for the roller, on which the latter turn when free from the upper and lower bearings. By reason of such reduction of diameter of the trunnions and depth of the channels or ways D' the bearing may be made of less height over all as compared with constructions wherein the trunnions serve to arrest the bodily movement of the roller.

The lower or bottom walls $d^5$ of the channels or ways D' are provided with openings through which pass the trunnions or end bearings when the roller is inserted in place, and stops or keys are necessary to close said openings in order to prevent the roller dropping out of its housing when the trunnions are in line with said openings. As a further and specific improvement in this feature of the bearing I have provided an improved form of key or filler designed to be readily fitted in place and when in place completely spans the opening and constitutes part of the continuous lower wall of the channel. The transverse opening in the lower wall of the channel is downwardly and outwardly inclined, and the key (designated as G) is provided with complementally-inclined side margins. The key is inserted into the opening from below after the roller has been placed in the casting. The key is made of somewhat less thickness than that of the lower channel-wall, so that when the key is brought with its upper face flush with the upper face of the lower channel-wall the lower face of said key is above the level of the lower face of said channel-wall. The key is held in place by upsetting the metal at the lower side margins of the opening against the side margins of the key, as clearly shown in Fig. 6.

I claim as my invention—

1. In a roller-bearing for railway-cars, an elongated chambered casting formed with integral side and end walls and open at its bottom, the side walls being provided on their inner faces with inwardly-opening channels or ways, a roller mounted in said casting and adapted to project through the open bottom thereof for contact with a lower bearing-surface, and provided with end bearings or trunnions which enter said channels and made of a diameter less than the vertical width of the channels, and an elongated bearing-plate in the top of the casting, one of said end walls being provided with an opening through which the plate is admitted longitudinally to the chambered casting, and the said wall of the casting, at the margin of said admission-opening, being upset against the end of the bearing-plate to constitute a stop to hold the latter in place.

2. In a roller-bearing for railway-cars, an elongated chambered casting formed with integral top, side and end walls and open at its bottom, the side walls being provided on their inner faces with inwardly-opening channels or ways, a roller mounted in said casting and adapted to project through the open bottom thereof for contact with a lower bearing-surface and provided with end bearings or trunnions which enter said channels and made of a diameter less than the vertical width of said channels, and an elongated bearing-plate fitted to the lower face of the top wall of the casting, one of the end walls of the casting being provided with an opening through which the plate is admitted longitudinally to the chambered casting, and the casting being provided with a ledge between which and the top of the casting is received a margin of the bearing-plate the said end wall of the casting at said admission-opening being upset against the end of said plate to constitute a stop to hold the plate in place.

3. In a roller-bearing for railway-cars, an elongated chambered casting provided with a downwardly-facing bearing-surface and formed with integral side and end walls and open at its bottom, the side walls being provided on their inner faces with inwardly-opening channels or ways, and a roller mounted in said chambered casting and adapted to project through said open bottom for contact with a lower bearing-surface, said roller being provided with end bearings or trunnions which enter said channels or ways and made of a diameter less than the vertical width of said channels, the end walls of the casting being curved complementally to the cylindric surface of the roller and serving as stops to engage and arrest the travel of the roller endwise of said bearing-casting.

In testimony that I claim the foregoing as my invention I affix my signature, in presence of two witnesses, this 6th day of June, A. D. 1905.

EDWIN S. WOODS.

Witnesses:
WILLIAM L. HALL,
G. B. WILKINS.